United States Patent [19]
Nitta et al.

[11] Patent Number: 5,800,909
[45] Date of Patent: Sep. 1, 1998

[54] SHEET FOR ILLUMINATED SIGNBOARD AND ILLUMINATED SIGNBOARD EMPLOYING THE SAME

[75] Inventors: Katsukuni Nitta; Kazuyo Senga, both of Tokyo, Japan

[73] Assignee: Oji-Yuka Synthetic Paper Co., Ltd., Tokyo, Japan

[21] Appl. No.: 857,820

[22] Filed: May 16, 1997

[30] Foreign Application Priority Data

May 31, 1996 [JP] Japan .................. 8-159272

[51] Int. Cl.$^6$ .................. B32B 5/16; B32B 27/10
[52] U.S. Cl. .................. 428/207; 428/218; 428/323; 428/325; 428/331; 428/315.9; 428/910
[58] Field of Search .................. 428/207, 218, 428/323, 325, 331, 315.9, 910

[56] References Cited

U.S. PATENT DOCUMENTS 5,494,735  2/1996  Nitta et al. .................. 428/207

FOREIGN PATENT DOCUMENTS 0 697 281 A1  2/1996  European Pat. Off. ......... B32B 27/08
79162A2       6/1997  European Pat. Off. ......... B41M 5/40

*Primary Examiner*—Richard Weisberger
*Attorney, Agent, or Firm*—Sughrue, Mion, Zinn, Macpeak & Seas, PLLC

[57] ABSTRACT

A sheet for an illuminated signboard is described which has as a base a composite sheet which is a plain weave fabric (I) having laminated on one or both sides thereof a microporous film (II) which is a stretched thermoplastic resin film containing fine white inorganic particles, where the sheet for an illuminated signboard satisfies the following requirements (1) to (4):

(1) it has an opacity of from 80 to 100%;
(2) it has a whiteness of from 85 to 100%;
(3) it has a total light beam average reflectance of from 12 to 40%; and
(4) it has a total light beam average transmittance of from 70 to 95%.

14 Claims, 2 Drawing Sheets

SHEET FOR ILLUMINATED SIGNBOARD AND ILLUMINATED SIGNBOARD EMPLOYING THE SAME

FIELD OF THE INVENTION

The present invention relates to a sheet for use in illuminated signboards for displaying menus, prices, etc., for fast food restaurants providing food such as hamburgers, sushi and chow mein, illuminated signboards for commercial advertising by department stores and supermarkets, illuminated signboards for advertisements of special sales of retail shops and supermarkets, illuminated signboards for advertising articles exhibited in art museums, and in illuminated signboards for displaying landscape or animal photographs in living, reception rooms or exhibition rooms, etc. The present invention also relates to an illuminated signboard employing such a sheet.

BACKGROUND OF THE INVENTION

Heretofore, a typical illuminated signboard has comprised a ground glass or semi-opaque high impact polystyrene plate (HIPS plate) having a store's name, telephone number, etc., written with paint thereon so that characters and patterns written on the plate can draw passengers and customers' attention upon illuminating the plate with an electric bulb or fluorescent tube on the side opposite the characters and patterns.

However, with the use of illuminated signboards at stores or underpasses, to advertise fast food restaurants, department stores, art museums, etc., multi-color printed posters which are aesthetically pleasing have been required. Accordingly, translucent tracing paper has come to be employed instead of ground glass or a semi-opaque HIPS plate. It has become a common practice to subject such translucent tracing paper to multi-color gravure printing, multi-color offset printing, multi-color screen printing or the like so that the printed paper can be used to make an illuminated signboard containing a light source illuminating the printed paper from the back side as shown in FIG. 1.

One such translucent tracing paper for an illuminated signboard is a synthetic tracing paper having an opacity of from 15 to 35% (as determined in accordance with JIS P-8138) which is made of a stretched thermoplastic resin film containing fine particles of a white inorganic material such as calcium carbonate or calcined clay. Such a paper exhibits a high bending strength and excellent printability and gives a good print appearance.

For example, JP-A-1-156062 (the term "JP-A" as used herein means an "unexamined published Japanese patent application") discloses the use, as a paper for an illuminated signboard, of a translucent multilayered polypropylene resin composite film comprising a biaxially stretched resin film made of from 75 to 95% by weight polypropylene resin and from 5 to 25% by weight high density polyethylene as a substrate layer (A) and, disposed on at least one side of the substrate layer (A), a uniaxially stretched laminate, which comprises a film (B) made of an olefinic resin composition consisting of (a) from 80 to 95% by weight polypropylene resin, (b) from 0 to 10% by weight olefinic resin selected from the group consisting of high density polyethylene, ethylene-vinyl acetate copolymers, and low density polyethylene and (c) from 5 to 20% by weight fine inorganic particles and a film (C) made of a propylene homopolymer or propylene random copolymer. The uniaxially stretched laminate is such that the uniaxially stretched film (C) of the propylene homopolymer or random copolymer is a surface layer. The resulting composite film has an opacity of from 3 to 25% as determined in accordance with JIS P-8138 and a gloss of from 65 to 95% as determined on the surface layer (C) in accordance with JIS P-8142 (75 degree).

The foregoing tracing paper is advantageous in that it exhibits an opacity of from 3 to 25%, a whiteness of from 70 to 80% and good transmission of light from the back side thereof. It thus gives a bright display of printed characters and patterns. However, some users, particularly art museums and department stores where art posters dealing primarily with a portrait which has a white background or art photographs dealing with a subject such as snow or white Japanese apricot blossoms are exhibited as illuminated signboards, have pointed out that the pattern displayed should have sharper outlines. Further, it has been necessary to interpose an acrylic resin plate containing a white inorganic filler and having an opacity of from 40 to 60% and a thickness of about 3 mm between the paper and fluorescent tubes disposed on the back side thereof in order to prevent the fluorescent tubes from being seen through the paper.

In order to make the outline of printed patterns sharper than that obtained with such a tracing paper while also preventing fluorescent tubes from being seen from the front side of the signboard, the general-purpose opaque synthetic paper having an opacity of not less than 90% and a whiteness of not less than 80% which is called YUPO FPG (trade name of a synthetic paper produced by Oji Yuka Synthetic Paper Co., Ltd., Japan) may be used. However, since this synthetic paper has an opacity as high as 90% or more, it transmits less light from the back side of the signboard. Namely, when this prior art synthetic paper is used as a poster paper for an illuminated signboard, the characters and patterns printed thereon are less bright when viewed by customers and passersby which thereby gives a gloomier impression than characters and patterns printed on tracing paper.

SUMMARY OF THE INVENTION

An object of the present invention is to provide a sheet for illuminated signboards which shows no decrease in transmittance of light from the back side thereof even when the opacity thereof is higher than that of conventional translucent tracing paper.

Another object of the present invention is to provide an illuminated signboard employing such a sheet.

The present invention provides, in a first aspect thereof, a sheet for an illuminated signboard having as a base a composite sheet comprising a plain weave fabric (I) having laminated on one or both sides thereof a microporous film (II) comprising a stretched thermoplastic resin film containing fine white (inorganic) particles, the sheet for an illuminated signboard satisfying the following requirements (1) to (4):

(1) it has an opacity (JIS P-8128) of from 80 to 100%;

(2) it has a whiteness (JIS L-1015) of from 85 to 100%;

(3) it has a total light beam average reflectance (JIS K-7105) of from 12 to 40%; and (4) it has a total light beam average transmittance (JIS K-7105) of from 70 to 95%.

The present invention further provides, in a second aspect thereof, an illuminated signboard comprising a sheet having an image or characters printed thereon, a frame to which the sheet is fixed, and a light source for illuminating the sheet, the sheet being a composite sheet which comprises a plain weave fabric (I) having laminated on one or both sides thereof a microporous film (II) comprising a stretched thermoplastic resin film containing fine white inorganic particles which satisfies the following requirements (1) to (4):

(1) it has an opacity of from 80 to 100%;

(2) it has a whiteness of from 85 to 100%;

(3) it has a total light beam average reflectance of from 12 to 40%; and (4) it has a total light beam average transmittance of from 70 to 95%.

Due to the presence of microvoids in the stretched film and due to the presence of the plain weave fabric, the light emitted by fluorescent tubes (4) disposed on the back side of an illuminated signboard poster (1) is diffused to thereby heighten the brightness of the display sheet (poster paper) (1). As a result, the illuminated printed characters and patterns have sharper outlines and higher lightness, and the poster paper is quite attractive.

Figure 1:
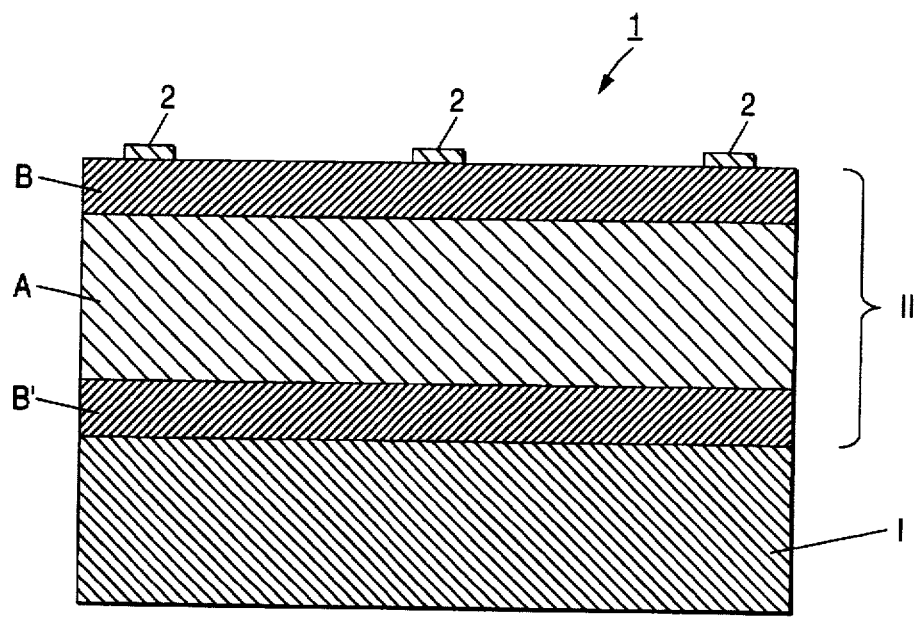
FIG. 1 is a view illustrating one embodiment of the sheet for illuminated signboards of the present invention.

The Symbols in the Figures have the following meaning
1 Sheet for illuminated signboard
2 Printing
3 Frame
4 Light source
5 Illuminated signboard
6 Reflector
I Woven fabric
II Microporous film
III Image Receiving layer
III' Antistatic polymer layer
A Substrate layer
B Front layer
B' Back layer

DETAILED DESCRIPTION OF THE INVENTION

Plain Weave Fabric (I):

The plain weave fabric (I) is preferably a white plain weave fabric (PONGEE) which is woven of warp and weft threads of 40 to 150 denier, preferably 50 to 100 denier, interlaced for every thread. The number of the warp threads (ends) and that of the weft threads (picks) each is from 50 to 140preferably from 60 to 100, per inch (2.54 cm). The has a basis weight of from 50 to 200 g/m², preferably from 50 to 100 g/m².

Useful examples of the material of the warp and weft threads constituting the plain weave fabric include nylon 6, nylon 6,6, poly(ethylene terephthalate), cotton, rayon, polyacrylonitrile, poly(fluoroethylene), polypropylene and poly(vinylidene fluoride).

The warp threads and the weft threads may have the same or different finenesses in the range of from 40 to 150 denier. From the standpoint of smoothness, they preferably have the same fineness. For the purpose of reinforcement, one or two warp and/or weft threads having a larger diameter than the other warp and/or weft threads may be interlaced per inch.

If warp or weft threads having a fineness below 40 denier are used for plain weaving, the resulting woven fabric is costly. On the other hand, warp or weft threads having a fineness exceeding 150 denier are undesirable in that they provide a woven fabric having a rough surface which results in a decrease in the gloss of any printing. If warp or weft threads are woven at less than 50 ends or picks per inch, printing of high gloss cannot be obtained and the improvement in the brightness of an illuminated signboard sheet is poor. This is because of the increased area of each space surrounded by the warp threads and the weft threads, even though the woven fabric may have high adhesive strength to the stretched resin film. On the other hand, a plain weave fabric having more than 140 ends or picks per inch is disadvantageous in that the adhesive strength between the woven fabric and the stretched resin film is too low to prevent delamination. In addition, since such a plain weave fabric has a reduced transmittance of the light emitted by fluorescent tubes from the back side thereof, it does not improve the brightness of an illuminated signboard sheet (poster sheet bearing printed patterns or characters).

Although the basis weight of the woven fabric varies depending on the density and fineness of the warp and weft threads and on the number of ends or picks, it is from 50 to 200 g/m², preferably from 50 to 100 g/m².

Besides plain weaving, other various weaving techniques including twilling, satin weaving, knitting, diagonal weaving, polo weaving and lace weaving may be used. However, plain weaving is the most desirable from the standpoint of print appearance.

Microporous Film (II):

The microporous film is a translucent or opaque film comprising a stretched thermoplastic resin film containing fine white inorganic particles. Examples of this microporous film include synthetic papers having an opacity (JIS P-8138) of from 65 to 100%, a whiteness (JIS L-1015) of from 85 to 100%, a void volume of from 10 to 60%, preferably from 20 to 45%, as calculated according to the following equation (1), and a thickness of from 30 to 200 μm, preferably from 50 to 150 μm.

$$\text{Void volume (\%)} = \frac{(\rho_0 - \rho)}{\rho_0} \times 100 \quad (1)$$

$\rho_0$: density of the unstretched resin film
$\rho$: density of the stretched resin film Specific examples of the microporous synthetic paper include the synthetic papers given below under (1) to (3).

(1) Biaxially stretched microporous thermoplastic resin films containing 8 to 65 wt % inorganic or organic filler (see, for example, JP-B-54-31032 and U.S. Pat. Nos. 3,775,521, 4,191,719, 4,377,616 and 4,560,614, hereby incorporated by reference).

(2) Synthetic papers comprising a base layer consisting of a biaxially stretched thermoplastic film and a paper-like layer consisting of a uniaxially stretched thermoplastic resin film containing 8 to 65 wt % fine inorganic particles (see, for example, U.S. Pat. No. 4,075,050, JP-A-57-149363 and JP-A-57-181829, hereby incorporated by reference).

The above microporous films (synthetic papers) may have a two layer structure, a three layer structure in which a uniaxially stretched film as a paper-like layer is laminated on each side of a base layer (see JP-B-46-40794 and U.S. Pat. No. 4,318,950, hereby incorporated by reference), a three to seven layer structure which contains one or more different resin film layers each interposed between a paper-like layer and a base layer (see JP-B-50-29738, JP-A-57149-363, JP-A-56-126155, JP-A-57-181829 and U.S. Pat. No. 4,472, 227, hereby incorporated by reference), or a multilayer structure which is composed of at least three layers including a heat sealable back layer comprising a resin having a lower melting point than the base layer resin, such as a propylene-ethylene copolymer, a metal (e.g., Na, Li, Zn, or K) salt of an ethylene-(meth)acrylic acid copolymer, or a chlorinated polyethylene (see JP-B-3-13973, hereby incorporated by reference).

A three-layered synthetic paper is produced, for example, by uniaxially stretching a thermoplastic resin film containing up to 50 wt % fine inorganic particles at a temperature lower than the melting point of the thermoplastic resin to obtain a uniaxially oriented film, laminating a film of a molten thermoplastic resin containing 8 to 65 wt % fine inorganic particles to each side of the uniaxially oriented film, and then stretching the laminated sheet in the direction perpendicular to the direction of the above uniaxial stretching. The synthetic paper thus obtained is a laminate composed of a biaxially oriented base layer sandwiched between two paper-like layers which each is a uniaxially oriented film containing many microvoids therein.

(3) Printable synthetic papers having high gloss produced by laminating a transparent thermoplastic resin layer having a thickness of 0.1 to 20 μm which contains no fine inorganic particles to the synthetic papers described in (2) above on the paper-like layer side (see JP-B-4-60437, JP-B-1-60411, JP-A-61-3748 and U.S. Pat. No. 4,663,216, hereby incorporated by reference). Examples thereof include: a synthetic paper which comprises a multilayered support film composed of a biaxially stretched thermoplastic resin film as a base layer and front and back layers each comprising a uniaxially stretched thermoplastic resin film containing 8 to 65 wt % fine inorganic particles, a transparent thermoplastic resin film layer provided on the front layer side of the support which contains no fine inorganic particles, and a primer coat layer having an antistatic function (see U.S. Pat. No. 4,663,216, hereby incorporated by reference); and a multilayered synthetic paper comprising a biaxially stretched thermoplastic resin film as a base layer and, provided on at least one side thereof, a laminate of a paper-like layer consisting of a uniaxially stretched thermoplastic resin film containing 8 to 65 wt % fine inorganic particles with a surface layer consisting of a uniaxially stretched thermoplastic resin film. The thickness (t) of the surface layer and the average particle diameter (R) of the fine inorganic particles in the paper-like layer satisfy relationship (2) shown below (see U.S. Pat. No. 4,705,719, hereby incorporated by reference).

$$R \geq t \geq \frac{1}{10} \times R \quad (2)$$

Like the synthetic papers described under (2), the multilayered synthetic papers (3) may have a heat-sealable layer on the front and back sides thereof.

Examples of thermoplastic resins useful as materials for the synthetic paper include polyolefin resins such as polyethylene, polypropylene, ethylene-propylene copolymers and poly(4-methylpentene-1), polystyrene, polyamides, poly-(ethylene terephthalate), partial hydrolyzates of ethylene-vinyl acetate copolymers, ethylene-acrylic acid copolymers and salts (K, Na, Li, Zn and Al) thereof, vinylidene chloride copolymers such as vinyl chloride-vinylidene chloride copolymers, vinyl chloride-alkyl acrylate copolymers and mixtures thereof. Preferred among these from the standpoint of water resistance and chemical resistance are polypropylene and polyethylene. When polypropylene is used as a material for a base layer, it is preferred to incorporate therein 3 to 25 wt % of a thermoplastic resin having a lower melting point than that of the polypropylene, such as, e.g., polyethylene, polystyrene or an ethylene-vinyl acetate copolymer, to thereby ensure satisfactory stretch-ability.

Examples of useful fine inorganic particles include white extender pigments such as calcium carbonate, calcined clay, silica, diatomaceous earth and talc, white reflective pigments such as titanium oxide, barium sulfate and zinc oxide, each having a particle diameter of from 0.03 to 16 μm. For any biaxially stretched film, the stretch ratio is preferably from 4 to 10 in each of the machine and transverse directions. Stretching temperatures are from 140° to 164° C. for a propylene homopolymer (melting point, 164°–167° C.), from 110° to 125° C. for high density polyethylene (melting point, 121°–134° C.), and from 104° to 115° C. for poly (ethylene terephthalate) (melting point, 246°–252° C.). The stretching speed is from 50 to 350 m/min.

Stretching may be conducted by means of a difference in circumferential speed between rolls used for stretching, or with a tenter, a mandrel or the like.

The nature of the microporous films satisfying the properties specified above can be varied by changing the kind of white extender pigment, the kind of white reflective pigment, the kind of thermoplastic resin, the proportions of these ingredients, stretching temperature, stretch ratio and/or layer constitution.

Especially preferred among the microporous films described above under (1) to (3) is, for example, a laminated film comprising a substrate layer (A) comprising a biaxially stretched thermoplastic resin film containing from 5 to 40% by weight fine white inorganic particles and, disposed on both sides of the substrate layer, front and back layers (B and B") each consisting of a uniaxially stretched thermoplastic resin film. Each uniaxially stretched thermoplastic resin film contains from 0.1 to 5% by weight of a white reflective pigment such as, e.g., titanium oxide, zinc oxide or barium sulfate and from 10 to 60% by weight of fine white inorganic particles (extender pigment) selected from calcium carbonate, calcined clay, silica and zeolities.

A biaxially stretched resin film may also be used which comprises from 35 to 75% by weight polypropylene, from 20 to 55% by weight high density polyethylene, from 1 to 10% by weight white reflective pigment and from 5 to 35% by weight white extender pigment.

Laminating:

An adhesive is used for laminating the plain weave fabric (I) to the microporous film (II).

A liquid anchor coating agent can be used as the adhesive. Examples thereof include polyurethane based anchor coating agents such as EL-150 (trade name) and a BLS-2080A/BLS-2080B mixture and polyester-based anchor coating agents such as AD-503 (trade name), all manufactured by Toyo Morton K. K., Japan. The anchor coating agent is applied at a spreading amount of 0.5 to 25 g/m².

A hot melt adhesive can also be used. Examples thereof include ethylene-vinyl acetate copolymers, low density polyethylene, a metal salt of an ethylene-(meth)acrylic acid copolymer (also called SURLYN), chlorinated polyethylene and chlorinated polypropylene. It is necessary to employ a thermoplastic resin having a melting point lower than the stretching temperature used in the production of the stretched resin film. If a hot melt adhesive is used at a temperature higher than the stretching temperature, the stretched resin film may shrink.

In the case where the anchor coating agent described above is used for bonding, the anchor coating agent can be applied to any surface of the weave fabric and the stretched resin film and they are press bonded by means of pressure rolls. In the case of using a hot melt adhesive, the bonding may be accomplished by extruding a melt of the hot melt adhesive on the weave fabric or on the stretched resin film in film form using a T-die to laminate the hot melt adhesive to either the weave fabric or stretched resin film, and then bonding the other of the weave fabric or the stretched resin film sheet thereto by means of pressure rolls. Alternatively, the bonding may be accomplished by laminating a film of the molten adhesive to a nonwoven fabric web comprising interlocking short fibers which is to be heated and pressed for producing a woven fabric sheet, subsequently superposing a stretched resin film thereon, and then pressing the resulting structure with rolls.

The laminated sheet may have a structure consisting of microporous film (II)/plain weave fabric (I), or have a structure consisting of microporous film (II)/plain weave fabric (I)/microporous film (II).

If the laminated sheet has an insufficient of opacity or an insufficient total light beam average reflectance, solid white printing may be performed at a printing thickness of 1 to 5 μm on one or both sides of the microporous film (II) by offset or gravure printing. Alternatively, the insufficient opacity or light reflectance may be improved by incorporating a large amount (5 to 75% by weight) of a white reflective pigment such as, e.g., titanium oxide whiskers or fine titanium oxide particles into a liquid adhesive (anchor coating agent) used for laminating the woven fabric (I) to the microporous film (II), and applying the resulting liquid adhesive in an amount of from 2 to 10 g/m² to conduct the laminating.

If desired or necessary, an image recording/receiving layer (III) may be formed on a surface of the microporous film (II). The layer (III) is selected from (a) an ink receiving layer capable of yielding a recorded image with a water based ink jet recording ink, (b) an ink receiving layer for thermosensitive recording, (c) a coating layer for laser printing, and (d) a thermal transfer image receiving layer.

A thin polymer film (III') having an antistatic function (thickness: 0.1–5 μm) may be formed on a surface of the microporous film (II) in order to impart satisfactory ink adhesion properties necessary for offset printing, gravure printing, flexography, etc., and to impart satisfactory feeding/discharge properties to the sheet.

The sheet for illuminated signboards of the present invention satisfies the following requirements:

(1) it has an opacity (JIS P-8138) of from 80 to 100%;

(2) it has a whiteness (JIS L-1015) of from 85 to 100%;

(3) it has a total light beam average reflectance (JIS K-7105) of from 12 to 40%; and (4) it has a total light beam average transmittance (JIS K-7105) of from 70 to 95%.

The above are properties which the composite sheet for illuminated signboards should possess prior to printing. The composite sheet comprises the plain weave fabric and the microporous film and further contains the adhesive, image recording/receiving layer, the antistatic polymer described above and may comprise other optional components.

The thickness of the sheet for illuminated signboards is generally from 70 to 230 μm, preferably from 80 to 200 μm.

A sheet for illuminated signboards which has an opacity less than 80% is undesirable in that the fluorescent tubes can be recognized from outside the sheet for illuminated signboards. Use of such a poorly opaque sheet may necessitate the use of a translucent light diffusing acrylic resin plate containing a white reflective pigment and having a thickness of from 3 to 5 mm (opacity: 40–70%) disposed on the back side of the sheet for illuminated signboards.

A sheet for illuminated signboards which has a whiteness lower than 85% is undesirable in that when this sheet is used as a portrait poster in which the background is white or is used as a landscape photograph poster dealing with a white subject such as cherry blossoms, snow, etc., to fabricate an illuminated signboard, the white parts cannot be expected to have improved brightness.

A sheet for illuminated signboards which has a value of total light beam average reflectance or total light beam average transmittance outside the ranges specified above is undesirable in that the effect of diffusing the light of the fluorescent tubes is insufficient and the sheet cannot be expected to provide a poster having improved brightness. Use of a poster having an insufficient brightness necessitates the use of light diffusing acrylic resin plate.

Of course, if an illuminated signboard fabricated using the sheet for illuminated signboards of the present invention is required to have a poster of further heightened brightness, the desired brightness may be obtained by providing a light diffusing plate between the poster and the fluorescent tubes or by providing a light reflector on the back side of the fluorescent tubes.

Image Recording/Receiving Layer (III)

The image recording/receiving layer (III) can be formed on the microporous film (II) by applying thereon a coating composition which yields any of an ink receiving layer for water based ink jet recording, a thermosensitive recording layer having the capability of forming a color, a coating layer for laser printing and a thermal transfer image receiving layer.

(i) Ink Receiving Layer for Water Based Ink Jet Recording:

The ink receiving layer (III) is a layer formed from a composition comprising a pigment as a main component, a water based adhesive and an ink setting agent. The composition preferably comprises, on a solid basis, from 50 to 88 wt % inorganic pigment, from 10 to 40 wt % water based adhesive, and from 2 to 20 wt % ink setting agent.

Examples of the pigment include synthetic silica, alumina hydrosol, talc, calcium carbonate and clay. Preferred among these are porous synthetic silica and alumina hydrosol.

Examples of the water based adhesive include poly(vinyl alcohol), silanol containing ethylene-vinyl alcohol copolymers, polyvinyl pyrrolidone, ethylene-vinyl acetate copolymers, methyl ethyl cellulose, poly(sodium acrylate) and starch. Preferred of these are poly(vinyl alcohol) and silanol containing ethylene-vinyl alcohol copolymers in the case where the pigment is porous synthetic silica or alumina sol.

Examples of the ink setting agent include quaternary ammonium salts of polyethylenimine, acrylic copolymers containing comonomer units having a quaternary ammonium group and epichlorohydrin adducts of a polyamine-polyamide.

The ink receiving layer can be formed on the microporous film by applying a coating composition containing the ingredients described above to the microporous film (II) at a spreading amount of from 5 to 50 g/m², preferably from 10 to 30 g/m² (on a solid basis), and then drying the coating.

If desired and necessary, the dried coating layer may be super calendered to smooth the coating layer (ink receiving layer).

(ii) Thermosensitive Recording Layer

The thermosensitive recording layer can be formed by coating a coating composition containing a color former and a color developer and drying the coating.

Examples of the color former and the color developer which can be used in the thermosensitive recording layer include those described below. Any combination of these color formers and these color developers can be used, so long as a color reaction takes place when they are brought into contact with each other. Examples of the combinations which can be used in the present invention include combinations of colorless or light colored basic dyes and inorganic or organic acid materials, the combination of metal salts of higher fatty acids such as iron (III) stearate and phenols such as gallic acid and the combination of diazonium compounds, couplers and basic materials.

(a) Color Formers

Various known compounds can be used as the colorless or light colored basic dyes as color formers in the thermosensitive recording layer.

Examples of the compounds which can be used as the color formers in the present invention include triallyl methane dyes such as 3,3-bis(p-dimethylaminophenyl)-6-dimethylaminophthalide, 3,3-bis(p-dimethylaminophenyl) phthalide, 3-(p-dimethylaminophenyl)-3-(1,2-dimethylindol-3-yl)phthalide, 3-(p-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-6-dimethylaminophthalide, 3,3-bis(2-phenylindol-3-yl)-6-dimethylaminophthalide, 3-p-dimethyl-aminophenyl-3-(1-methylpyrrol-3-yl)-6-dimethylaminophthalide, etc.; diphenylmethane dyes such as 4,4'-bisdimethylaminobenzhydryl benzyl ether, N-halophenyl leucoauramine, N-2,4,5-trichlorophenyl leucoauramine, etc.; thiazine dyes such as benzoyl leucomethylene blue, p-nitrobenzoyl leuco-methylene blue, etc.; spiro dyes such as 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho(6'-methoxybenzo)-spiropyran, 3-propyl-spiro-dibenzopyran, etc.; lactam dyes such as Rhodamine-B anilinolactam, Rhodamine(p-nitroanilino)lactam, Rhodamine(o-chloroanilino)lactam, etc.; and fluoran dyes such as 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-N-acetyl-N-methylaminofluoran, 3-diethylamino-7-N-methylaminofluoran, 3-diethylamino-7-dibenzylaminofluoran, 3-diethylamino-7-N-methyl-N-benzylaminofluoran, 3-diethylamino-7-N-chloroethyl-N-methylaminofluoran, 3-diethylamino-7-N-diethylaminofluoran, 3-(N-ethyl-p-toluidino)-6-methyl-7-phenylaminofluoran, 3-(N-cyclopentyl-N-ethylamino)-6-methyl-7-anilinofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-(N-cyclohexyl-N-methylamino)-6-methyl-7-phenylaminofluoran, 3-piperidino-6-methyl-7-phenylaminofluoran, 3-piperidino-6-methyl-7-p-butylphenylaminofluoran, 3-diethylamino-6-methyl-7-xylidinofluoran, 3-diethylamino-7-(o-chlorophenylamino)fluoran, 3-dibutylamino7-(o-chlorophenylamino)fluoran, 3-pyrrolidino-6-methyl-7-p-butylphenylaminofluoran, 3-N-methyl-N-tetrahydrofurfurylamino-6-methyl-7-anilinofluoran, 3-N-ethyl-N-tetrahydrofurfurylamino-6-methyl-7-anilinofluoran, etc.

(b) Developers

Various compounds known for use as the inorganic or organic acid materials that are brought into contact with the basic dyes to form color can be used in the present invention.

Examples of the inorganic acid materials include activated clay, terra alba, attapulgite, bentonite, colloidal silica and aluminum silicate.

Examples of the organic acid materials include phenolic compounds such as 4-tert-butylphenol, 4-hydroxydiphenoxide, α-naphthol, β-naphthol, 4-hydroxyacetophenol, 4-tert-octylcatechol, 2,2'-dihydroxydiphenol, 2,2'-methylenebis(4-methyl-6-tert-isobutylphenol), 4,4-isopropylidenebis(2-tert-butylphenol), 4,4'-sec-butylidenediphenol, 4-phenylphenol, 4,4'-isopropylidenediphenol (bisphenol A), 2,2'-methylenebis(4-chlorophenol), hydroquinone, 4,4'-cyclohexylidenediphenol, benzyl 4-hydroxybenzoate, dimethyl 4-hydroxyphthalate, hydroquinone monobenzyl ether, phenol novolak resins, phenol polymers, etc.; aromatic carboxylic acids such as benzoic acid, p-tert-butylbenzoic acid, tri-chlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-tert-butylsalicylic acid, 3-benzylsalicylic acid, 3-(α-methylbenzyl)salicylic acid, 3-chloro-5-(α-methylbenzyl)salicylic acid, 3,5-di-tert-butylsalicylic acid, 3-phenyl-5-(α,α-dimethylbenzyl) salicylic acid, 3,5-di-α-methyl-benzylsalicylic acid, etc.; and the salts of the foregoing phenolic compounds or aromatic carboxylic acids with polyvalent metals such as zinc, magnesium, aluminum, calcium, titanium, manganese, tin, nickel, etc.

(c) Weight Ratio

The basic dyes (color formers) and the developers may be used either alone or each as a combination of two or more thereof. The ratio of the basic dyes to the developers depends on the types of basic dyes and developers that are used. However, the developers are generally used in an amount of about 1 to 20 parts by weight, preferably about 2 to 10 parts by weight, per one part by weight of the basic dyes.

(d) Coating Composition

The coating composition containing these materials is generally prepared by uniformly or separately dispersing the basic dye (color former) and the developer in water, as a dispersion medium, by stirring and grinding using means such as a ball mill, an attritor, a sand mill, etc.

The coating composition generally contains a binder such as starch, hydroxyethyl cellulose, methyl cellulose, carboxymethyl cellulose, gelatin, casein, gum arabic, polyvinyl alcohol, acetoacetyl group-modified polyvinyl alcohol, a diisobutylene/maleic anhydride copolymer salt, a styrene/maleic anhydride copolymer salt, an ethylene/acrylic acid copolymer salt, a styrene/butadiene copolymer emulsion, a urea resin, a melamine resin, an amide resin, an amino resin, etc., in an amount of from about 2 to 40% by weight, and preferably from about 5 to 25% by weight, of the total solid components.

(e) Other Additives

The coating composition may contain various optional additives. Examples of such additives include dispersants such as the sodium dioctyl sulfosuccinate, sodium dodecylbenzenesulfonate, the sodium salt of lauryl alcohol sulfuric ester and metal salts of fatty acids; ultraviolet absorbers such as benzophenone ultraviolet absorbers; antifoaming agents, fluorescent dyes, colored dyes and electrically conductive materials.

Furthermore, the coating composition may optionally contain waxes such as zinc stearate, calcium stearate, polyethylene wax, carnauba wax, paraffin wax, ester wax, etc.; fatty acid amides such as stearic acid amide, stearic acid methylenebisamide, oleic acid amide, palmitic acid amide, coconut fatty acid amide, etc.; hindered phenols such as 2,2'-methylenebis(4-methyl-6-tert-butylphenol), 1,1,3-tris (2-methyl-4-hydroxy-5-tert-butylphenyl)butane, etc.; ultraviolet absorbers such as 2-(2'-hydroxy-5'-methylphenyl) benzotriazole, 2-hydroxy-4-benzyloxybenzophenone, etc.; esters such as 1,2-di(3-methylphenoxy)ethane, 1,2-diphenoxyethane, 1-phenoxy-2-(4-methylphenoxy)ethane, terephthalic acid dimethyl ester, terephthalic acid dibutyl ester, terephthalic acid dibenzyl ester, p-benzyl-biphenyl, 1,4-dimethoxynaphthalene, 1,4-diethoxynaphthalene, 1-hydroxynaphthoic acid phenyl ester, etc.; various kinds of known thermoplastic substances, and inorganic pigments such as kaolin, clay, talc, calcium carbonate, calcined clay, titanium oxide, diatomaceous earth, fine granular anhydrous silica, active clay, etc.

(iii) Thermal Transfer Image Receiving Layer

The thermal transfer image receiving layer is an image receiving layer which, when superposed on a thermal transfer sheet and heated together with the same, is capable of receiving an ink transferred from the thermal transfer sheet to form an image.

This image receiving layer is formed by applying a coating composition for image receiving layer formation and drying the coating to remove solvent.

Examples of resins usable as a component of the coating composition for image receiving layer formation include oligo ester acrylate resins, saturated polyester resins, vinyl chloride-vinyl acetate copolymers, acrylic ester-styrene copolymers and epoxy acrylate resins. A solution of any of these resins in toluene, xylene, methyl ethyl ketone, cyclohexanone or another solvent is used as a coating composition.

An ultraviolet absorber and/or a light stabilizer can be incorporated into the coating composition in order to enhance light resistance.

Examples of the ultraviolet absorber include 2-(2'-hydroxy-3,3'-di-t-butylphenyl)-5-chlorobenzotriazole, 2-(2-hydroxy-3,5-t-amylphenyl)-2H-benzotriazole, 2-(2'-hydroxy-3'-t-butyl-5'-methylphenyl)-5-chlorobenzotriazole, 2-(2'-hydroxy-3',5'-t-butylphenyl)benzotriazole and 2-(2'-hydroxy-3',5'-di-t-amylphenyl)benzotriazole.

Examples of the light stabilizer include distearylpentaerythritol diphosphite, bis(2,4-di-t-butylphenyl) pentaerythritol diphosphite, dinonylphenylpentaerythritol diphosphite, cyclic neopentanetetra-yl bis (octadecylphosphite), tris(nonylphenyl) phosphite and 1-[2-[3-(3,5-dit-butyl-4-hydroxyphenyl)propionyloxy]-2,2,6,6-tetramethylpiperidine.

The addition amount of the ultraviolet absorber and the light stabilizer each is from 0.05 to 10 parts by weight, preferably from 0.5 to 3 parts by weight, per 100 parts by weight of the resin contained in the image receiving layer.

A release agent can be incorporated into the image receiving layer to improve releasability from the thermal transfer sheet after heating thereon. Examples of the release agent include solid waxes such as polyethylene wax, amide wax, and poly(tetrafluoroethylene) powder, surfactants and phosphoric esters and silicone oils. Preferred among these are silicone oils. Although oily silicone oils can be used, curable silicone oils are preferred.

A white pigment can also be incorporated into the image receiving layer for improving the whiteness of the image receiving layer to enhance the clarity of transferred images, and rendering the surface of the thermal transfer image receiving layer amendable to writing with a pencil. Examples of the white pigment include titanium oxide, zinc oxide, kaolin and clay. A mixture of two or more of these can also be used.

The titanium oxide may be anatase titanium oxide or rutile titanium oxide. Examples of the anatase titanium oxide include KA-10, KA-20, KA-15, KA-30, KA-35, KA-60, KA-80 and KA-90 (trade names; all manufactured by Titan Kogyo K.K., Japan). Examples of rutile titanium oxide include KR-310, KR-380, KR-460 and KR-480 (trade names; all manufactured by Titan Kogyo K.K.). The addition amount of the white pigment is from 5 to 90 parts by weight, preferably from 30 to 80 parts by weight, per 100 parts by weight of the resin contained in the image receiving layer.

The thickness of the thermal transfer image receiving layer is generally from 0.2 to 20 µm, preferably from 3 to 15 µm.

Thermal Transfer Sheets

Various kinds of thermal transfer sheets can be used for transferring an ink to the thermal transfer image receiving layer to form an image. An example of the thermal transfer sheets is one which comprises a base layer consisting of, e.g., a polyester film, which has formed thereon a layer of a composition which comprises a binder and a colorant as major components and which optionally can contain additive ingredients such as a softener, a plasticizer, a melting point regulator, a leveling agent and a dispersant.

Examples of the above major components are as follows. Useful binders include known waxes such as paraffin wax, carnauba wax and ester wax and various polymers having a low melting point, e.g., polyesters and polyamides. Useful colorants include carbon black and various organic and inorganic pigments or dyes. Sublimable inks may also be used.

(iv) Coating Layer for Laser Printing (a) Coating Composition for Laser Printing A coating composition for forming a coating layer for laser printing basically comprising from 80 to 40 wt % of an acrylurethane resin or a polyester based polyurethane and from 20 to 60 wt % inorganic fine powder can be used.

An example of the coating layer for laser printing comprises a matrix consisting of an acrylic acid or meth-acrylic acid (hereinafter referred to simply as "(meth)acrylic acid") ester polymer crosslinked with urethane bonds and a filler dispersed in the matrix.

The above-mentioned acrylurethane resin is described, e.g., in JP-B-53-32386 and JP-B-52-73985, hereby incorporated by reference.

Such an acrylurethane resin is generally obtained by reacting a urethane prepolymer obtained from a polyisocyanate and a polyhydric alcohol with a hydroxy mono(meth) acrylate. Polymerizing the ethylenic bonds of the acrylurethane resin provides a (meth)acrylic ester polymer crosslinked with urethane bonds.

The above (meth)acrylic ester polymer is a homopolymer or copolymer of a (meth)acrylic ester in which the alcohol moiety has at least one (preferably one) hydroxyl group.

The polymer containing hydroxyl groups has a hydroxyl value of from 20 to 200, preferably from 60 to 130. Hydroxyl value as used herein means the number of milligrams of potassium hydroxide necessary to neutralize the acetic acid bonded to hydroxyl groups in the acetylation of 1 g of a sample.

The (meth)acrylic ester which provides such a polymer is a monoester of an alcohol compound having at least two (preferably two) hydroxyl groups. The term "alcohol compound" as used herein includes not only typical alkanols but polyoxyalkylene glycols (where the alkylene moiety has about 2 or 3 carbon atoms). Examples of such (meth)acrylic esters include 2-hydroxyethyl (meth)acrylate, 2-hydroxypropyl (meth)acrylate, di- or polyethylene glycol mono(meth)acrylate and glycerol mono(meth)acrylate.

From the standpoint of a balance among the hardness, toughness and elasticity of the cured coating composition, the (meth)acrylic ester polymer is preferably a copolymer. Various monomers copolymerizable with the (meth)acrylic esters may be suitably used according to the intended application. Examples of useful comonomers include methylcyclohexyl (meth)acrylate, styrene, vinyl toluene and vinyl acetate. In addition to the copolymerization of a hydroxylated (meth)acrylic ester, the desired copolymer can also be produced from a polymer having groups capable of being changed into hydroxyl groups by treating the polymer to convert those groups into hydroxyl groups. It is convenient to employ solution polymerization.

Examples of the polyisocyanate used for forming urethane bond units include 2,6-tolylene diisocyanate, 2,4-tolylene diisocyanate, xylylene diisocyanate, diphenylmethane diisocyanate, 1,6-hexamethylene diisocyanate, and compounds obtained from derivatives of these which contain at least two isocyanate groups per molecule.

The acrylurethane resin which constitutes such a (meth) acrylic ester polymer matrix crosslinked with urethane bonds may be partly replaced with a vinyl chloride-vinyl acetate copolymer.

The matrix resin may also be a polyester resin obtained by reacting an aliphatic polycarboxylic acid, e.g., adipic acid or sebacic acid, with a polyhydric alcohol, e.g., ethylene glycol, propylene glycol, butanediol, or polyethylene glycol, or a polyester polyurethane obtained by reacting the above polyester resin with a polyisocyanate.

An inorganic filler as is conventionally employed in conventional coating compositions can be incorporated in the coating composition for laser printing. Examples thereof include calcium carbonate, calcined clay, titanium oxide, barium sulfate and diatomaceous earth.

(b) Spreading Amount

The coating composition is generally applied at a spreading amount of from 0.5 to 20 g/m$^2$, preferably from 2 to 8 g/m$^2$, on a solid basis.

Formation of Recording Layer

The recording/receiving layer (II) formed on a surface of the microporous film may be any of: a thermosensitive recording layer capable of yielding color on thermal processing; a thermal transfer image receiving layer which, when superposed on a thermal transfer sheet and heated together with the same, is capable of receiving the ink transferred from the thermal transfer sheet to form a printed image; a coating layer for laser printing on which a printed image can be formed with a laser printer; and an ink receiving layer for receiving a water based ink jet recording ink.

Coating

The coating composition for forming a thermosensitive recording layer containing a color former and a developer, the coating composition for forming a thermal transfer image receiving layer, the coating composition for forming a coating layer for laser printing, or the coating composition for forming a layer for receiving an ink jet recording liquid is generally applied with a brush, roller, pad or spray gun or by dipping or other means. The resulting coating is dried at a temperature sufficient to volatilize or vaporize the solvent used.

Specifically, in the case of roller coating, the coating composition containing a solvent is applied to the front side surface of the microporous film by means of a rotating roll in contact with a roll partly immersed in the coating fluid placed in a tank.

Figure 2:
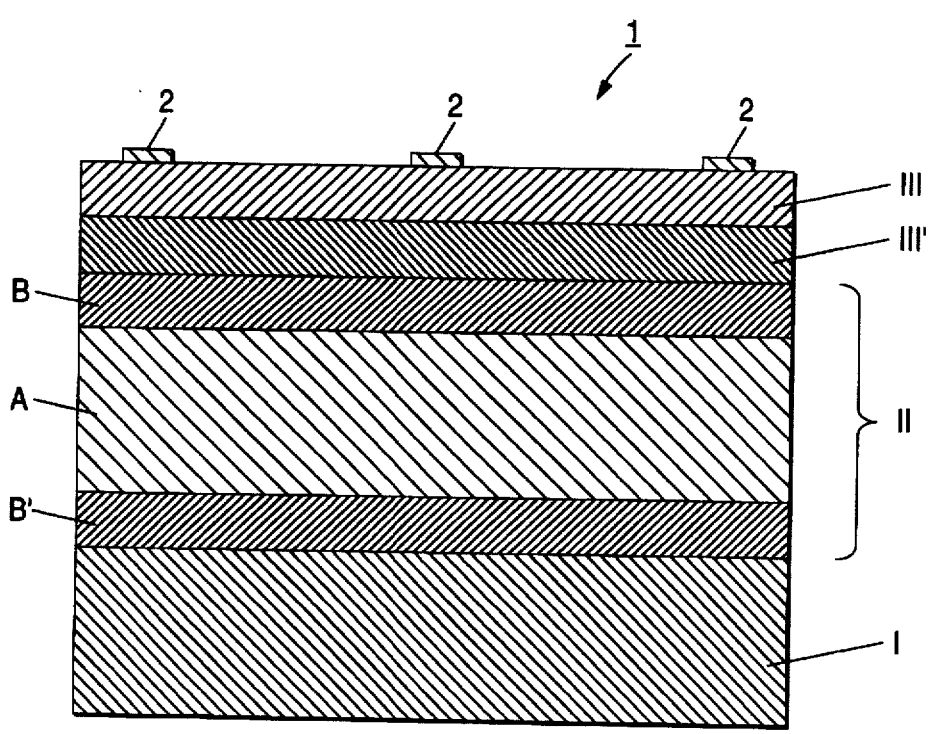
FIG. 2 is a view illustrating another embodiment of the sheet for illuminated signboards of the present invention.

FIGS. 1 and 2 illustrate embodiments of the sheet (composite sheet) for illuminated signboards of the present invention. In the figures, 1 denotes a composite sheet, (I) a plain weave fabric, (II) a microporous film, (III) an image receiving layer, (III') an antistatic polymer layer, 2 printing, A a substrate layer, B a front layer, and B' a back layer.

Illuminated Signboard

Figure 3:
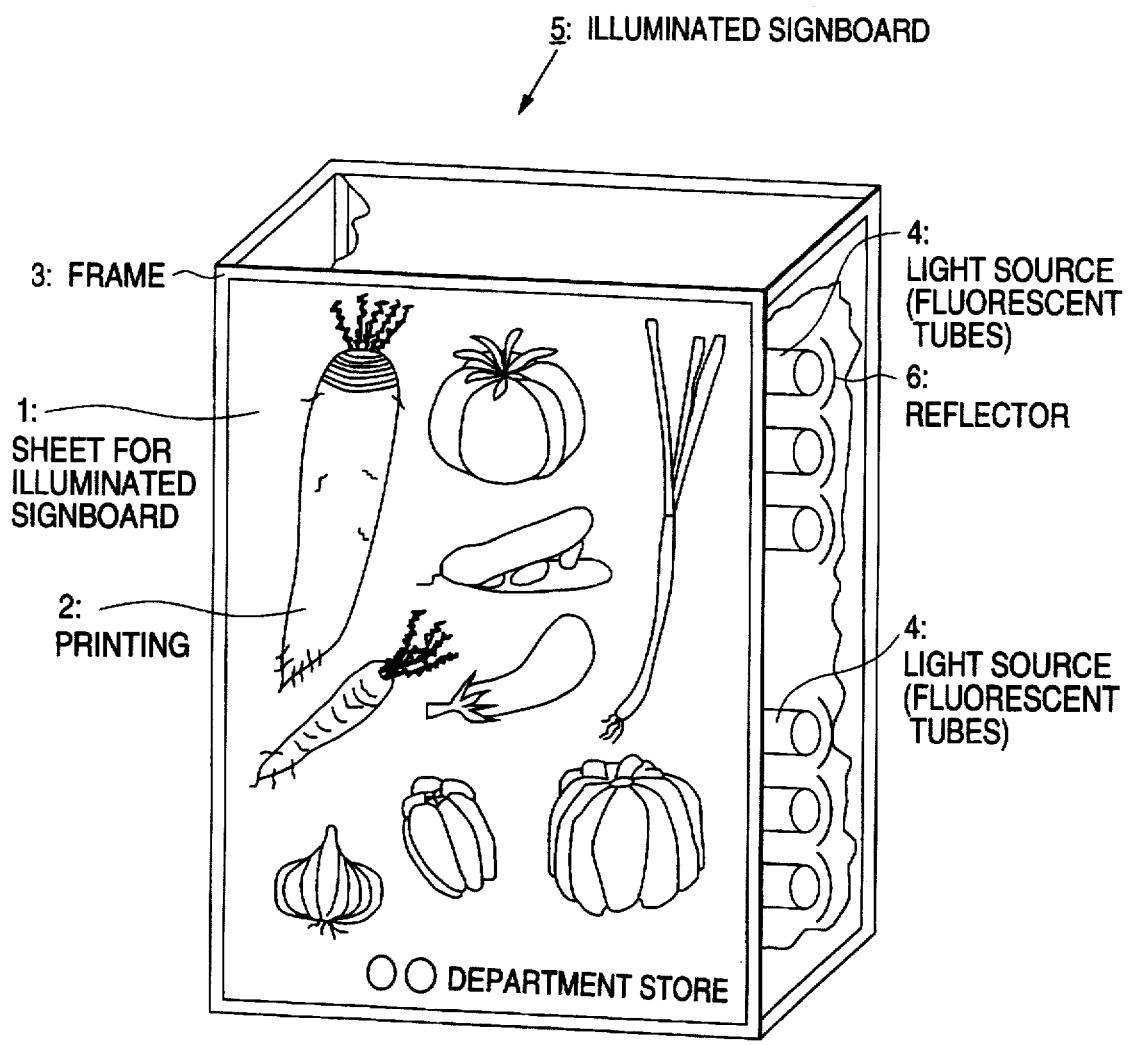
FIG. 3 is a partially cutaway perspective view of an illuminated signboard of the present invention.

The name of merchandise (e.g., a menu), the price, the name of a store, a pattern, etc., (2) are printed on the surface of the microporous film (II), image receiving layer (III), or antistatic polymer layer (III') of the sheet for illuminated signboards by means of a gravure printing press, screen printing machine, offset press, ink jet recorder employing a water based ink, etc. As shown in FIG. 3, the resulting poster paper (1) for illuminated signboards is fixed to a frame (3), and is illuminated by a light source (4), e.g., fluorescent tubes, electric bulbs, mercury lamps or xenon lamps, from the back side thereof. The illuminated poster paper (1) transmits and diffuses the light. Thus, an illuminated signboard (5) is fabricated. Numeral (6) denotes a reflector.

The present invention will now be explained below in more detail by reference to the following Examples. However, the invention should not be construed as being limited thereto.

EXAMPLE 1

Production of Microporous Film

Production Example 1

(1) A composition (a) consisting of 81 wt % polypropylene having a melt flow rate (MFR) of 0.8 g/10 min (melting point, about 164° to 167° C.; crystallinity, 67%), 3 wt % high density polyethylene, and 16 wt % calcium carbonate having an average particle diameter of 1.5 μm was melt-kneaded in an extruder set at 270° C., extruded into sheeting, and then cooled in a cooling machine to obtain an unstretched film.

This film was reheated to 150° C. and stretched in the machine direction to a stretch ratio of 5 to obtain a stretched film having a machine direction stretch ratio of 5.

(2) A composition (b) consisting of 54 wt % polypropylene having an MFR of 4 g/10 min (melting point, about 164 to 167° C.), 0.3 wt % anatase titanium oxide having an average particle diameter of 0.8 μm, and 45.7 wt % calcium carbonate having an average particle diameter of 1.5 μm was melt-kneaded in separate extruders at 210° C. The resulting melts were fed to dies, extruded into sheeting using the dies, and then laminated respectively to both sides of the stretched film obtained in step (1) above which had a machine direction stretch ratio of 5. The resulting three layered laminate film was cooled to 60° C. and then reheated to about 155° C., at which temperature it was stretched in the transverse direction to a stretch ratio of 7.5 with a tenter. After the stretched laminate film was annealed at 165° C., it was cooled to 60° C. and trimmed. Thus, a stretched resin film was obtained which was a three layered laminate (uniaxially stretched film/biaxially stretched film/uniaxially stretched film) having a total thickness of 122 μm (b/a/b=31 μm/60 μm/31 μm), an opacity of 94%, a void volume of 31% and a density of 0.79 g/cm$^3$.

Woven Fabric

As a woven fabric there was used the plain weave polyester fabric "PONGEE #6575" (trade name), manufactured by Toray Industries, Inc., Japan (warp thread diameter, 75 denier; weft thread diameter, 75 denier; number of ends per inch, 90; number of picks per inch, 85; basis weight, 71 g/m$^2$; whiteness, 90%; opacity, 80%).

The multilayered stretched resin film obtained above was coated on one side with an adhesive consisting of a mixture of the polyurethane anchor coating agents "BLS-2080A"

and "BLS-2080B", manufactured by Toyo Morton K.K., Japan, in an amount of 4 g/m² (on a solid basis). Subsequently, the plain weave fabric "PONGEE #6575", manufactured by Toray Industries, Inc., was bonded thereto by means of pressure rolls to obtain a support composed of plain weave fabric/opacifying layer/stretched resin film. This support had a thickness of 160 μm.

A coating composition for forming an ink receiving layer which was prepared according to the following formulation was applied to the stretched resin film of the support in an amount of 30 g/m² on a solid basis. After the coating was dried, the coated support was subjected to a smoothing treatment with a super calender to obtain an ink jet recording sheet (sheet for illuminated signboards), which had the properties shown in Table 1.

Formulation for the Coating Composition:

| | |
|---|---|
| Synthetic silica powder | 100 parts by weight |
| Calcined clay | 20 parts by weight |
| Poly(vinyl alcohol) | 30 parts by weight |
| Quaternary ammonium salt of polyethylenimine | 10 parts by weight |
| Poly(sodium acrylate) | 5 parts by weight |
| Water | 1,600 parts by weight |

COMPARATIVE EXAMPLE 1

(1) A composition (a) consisting of 81 wt % polypropylene having a melt flow rate (MFR) of 0.8 g/10 min (melting point, about 164° to 167° C.), 3 wt % high density polyethylene, and 16 wt % calcium carbonate having an average particle diameter of 1.5 μm was melt-kneaded in an extruder set at 270° C., extruded into sheeting, and then cooled in a cooling machine to obtain an unstretched film. This film was reheated to 140° C. and stretched in the machine direction to a stretch ratio of 5 to obtain a stretched film having a machine direction stretch ratio of 5.

(2) A composition (b) consisting of 54 wt % polypropylene having an MFR of 4.0 g/10 min (melting point, about 164° to 167° C.), 0.3 wt % of anatase titanium oxide having an average particle diameter of 0.8 μm, and 45.7 wt % calcium carbonate having an average particle diameter of 1.5 μm was melt-kneaded in separate extruders. The resulting melts were extruded into sheeting using dies, and then laminated respectively to both sides of the stretched film obtained in step (1) above which had a machine direction stretch ratio of 5. Thus, a three layered laminate film was obtained.

The resulting three layered laminate film was cooled to 60° C. and then reheated to about 160° C., at which temperature it was stretched in the transverse direction to a stretch ratio of 7.5 with a tenter. After the stretched laminate film was annealed at 165° C., it was cooled to 60° C. and trimmed. Thus, a stretched resin film was obtained which was a three layered laminate (uniaxially stretched film/biaxially stretched film/uniaxially stretched film) having a total thickness of 95 μm (b/a/b=18 μm/60 μm/17 μm), a density of 0.77 g/cm³ and an opacity of 95%. The void volumes of the individual layers were (b/a/b=30%/33.7%/30%).

This laminate film was coated on one side with the same coating composition for forming an ink receiving layer as in Example 1, dried, and then calendered in the same manner as in Example 1. Thus, an ink jet recording sheet having the properties shown in Table 1 was obtained.

COMPARATIVE EXAMPLE 2

(1) A mixture (A) consisting of 92 wt % propylene homopolymer having a melt flow rate (MFR) of 0.8 g/10 min (melting point, 164° C.) and 8 wt % high density polyethylene was kneaded in an extruder, extruded into sheeting using a die, and then cooled in a cooling machine to obtain an unstretched film. This film was heated to 155° C. and stretched in the machine direction to a stretch ratio of 5.

(2) A composition (B) consisting of 56 wt % polypropylene having an MFR of 4.0 g/10 min, 40 wt % calcium carbonate having an average particle diameter of 1.5 μm, 0.5 wt % anatase titanium oxide having an average particle diameter of 0.8 μm, and 3.5 wt % high density polyethylene was melt-kneaded in separate extruders. The resulting melts were fed to dies and laminated respectively to both sides of the stretched sheet obtained in (1) above which had a stretch ratio of 5, in such a manner that composition (B) constituted the outer layers. This laminate was heated to 185° C. and then stretched in the transverse direction to a stretch ratio of 7.5 to obtain a three layered laminate film.

(3) The surface of the resulting three layered laminate film was subjected to a corona discharge treatment to obtain a three layered laminate in which the individual layers (B)/(A)/(B) had thicknesses of 18/39/18 μm.

This three layered laminate film, had a total thickness of 75 μm, an opacity of 42%, a whiteness of 88%, a total light beam average reflectance of 32% and a total light beam average transmittance of 65%.

The thus obtained laminate film was coated on one side with the same coating composition for forming an ink receiving layer as in Example 1, dried and then calendered in the same manner as in Example 1. Thus, an ink jet recording sheet for water based inks was obtained.

Evaluation

Using an ink jet printer manufactured by Canon Inc., Japan, the ink receiving layer of each of the ink jet recording sheets obtained in Example 1 and Comparative Examples 1 and 2 was printed in four colors, i.e., yellow, magenta, cyan and black, to form a design in which a woman wearing a kimono carrying a gift in her arms was on a white background also bearing the name of a department store. Thus, poster papers for illuminated signboards were obtained.

Each of these poster papers was fixed to a frame. Six 40 watt white fluorescent tubes were spaced 5 cm from the back surface of each poster paper to obtain illuminated signboards.

These illuminated signboards were installed in a corridor of a factory. The signboards were then evaluated for appearance by ten employees of Oji Yuka Synthetic Paper Co., Ltd., five employees of an advertising agency, and five employees of the department store whose name was on the poster paper.

The signboards were graded from the 1st to 3rd positions according to their evaluation. The number of votes for these positions were then totalized.

The results obtained are shown in Table 1.

TABLE 1

| Structure | Example 1 Recording layer/ synthetic paper/ woven fabric | Comparative Example 1 Recording layer/ opaque synthetic paper | Comparative Example 2 Recording layer/ synthetic tracing paper |
|---|---|---|---|
| Thickness (μm) | 225 | 160 | 140 |

TABLE 1-continued

| Structure | Example 1 Recording layer/ synthetic paper/ woven fabric | Comparative Example 1 Recording layer/ opaque synthetic paper | Comparative Example 2 Recording layer/ synthetic tracing paper |
| --- | --- | --- | --- |
| Opacity (%) | 94 | 93 | 57 |
| Whiteness (%) | 95 | 95 | 92 |
| Total light beam average reflectance (%) | 18 | 14 | 53 |
| Total light beam average transmittance (%) | 90 | 91 | 65 |
| Density (g/cm$^3$) | 0.70 | 0.63 | 0.75 |
| Evaluation | | | |
| Number of persons giving the 1st position | 17 | 0 | 3 |
| Number of persons giving the 2nd position | 3 | 2 | 15 |
| Number of persons giving the 3rd position | 0 | 18 | 2 |

EXAMPLE 2

(1) A composition (a) consisting of 81 wt % propylene homopolymer having a melt flow rate (MFR) of 0.8 g/10 min (melting point, about 164° to 167° C.), 3 wt % high density polyethylene and 16 wt % calcium carbonate having an average particle diameter of 1.5 μm was melt-kneaded in an extruder set at 270° C. The kneaded composition was fed to a die, extruded into sheeting using the die and then cooled in a cooling machine to obtain an unstretched film.

This film was reheated to 150° C. and stretched in the machine direction to a stretch ratio of 5 to obtain a stretched film having a machine direction stretch ratio of 5.

(2) A composition (b) consisting of 54 wt % polypropylene having an MFR of 4 g/10 min (melting point, about 164° to 167° C.) and 46 wt % calcium carbonate having an average particle diameter of 1.5 μm was melt-kneaded in separate extruders at 210° C. The resulting melts were fed to dies, extruded into sheeting using the dies and then laminated respectively to both sides of the stretched film obtained in step (1) above which had a machine direction stretch ratio of 5. The resulting three layered laminate film was cooled to 60° C. and then reheated to about 155° C., at which temperature it was stretched in the transverse direction to a stretch ratio of 7.5 with a tenter. After the stretched laminate film was annealed at 165° C., it was cooled to 60° C. and then coated on both sides with an aqueous solution (d) of a water soluble antistatic polymer "ST-3200" (trade name), manufactured by Mitsubishi Chemical Corp., Japan, in an amount of 0.3 g/m$^2$ on a solid basis for each side. The coated film was then trimmed. Thus, a stretched resin film was obtained which was a three-layered laminate (uniaxially stretched film/biaxially stretched film/uniaxially stretched film) having a total thickness of 95 μm (b/a/b=18 μm/60 μm/17 μm), an opacity of 95%, a void volume of 31% and a density of 0.78 g/cm$^3$.

Woven Fabric

As a woven fabric there was used a plain weave polyester fabric "PONGEE #6575" (trade name), manufactured by Toray Industries, Inc. (warp thread diameter, 75 denier; weft thread diameter, 75 denier; number of ends per inch, 90; number of picks per inch, 85; basis weight, 71 g/m$^2$; whiteness, 90%; opacity, 80%).

The multilayered stretched resin film obtained above was coated on one side with an adhesive consisting of 85 parts by weight of a mixture of polyurethane anchor coating agents "BLS-2080A" and "BLS-2080B", manufactured by Toyo Morton K. K., and 15 parts by weight of titanium oxide in an amount of 4 g/m$^2$ (on a solid basis). Subsequently, a plain weave fabric "PONGEE #6575", manufactured by Toray Industries, Inc., was bonded thereto by means of pressure rolls to obtain a sheet for illuminated signboards which was composed of plain weave fabric/opacifying layer/ stretched resin film. This sheet had a thickness of 133 μm and an opacity of 89%.

This sheet was wound into a roll and then unwound. As a result, no curling was observed. The sheet obtained had the properties shown in Table 2.

COMPARATIVE EXAMPLE 3

(1) A mixture (A) consisting of 89 wt % propylene homopolymer having an MFR of 0.8 g/10 min (melting point, 164° C.), 8 wt % high density polyethylene and 3 wt % calcium carbonate particles having a particle diameter of 1.5 μm was melt-kneaded in an extruder, extruded into sheeting using a die and then cooled in a cooling machine to obtain an unstretched film. This film was heated to 155° C. and stretched in the machine direction to a stretch ratio of 5.

(2) Propylene homopolymer (C) having an MFR of 4.0 g/10 min and a composition (B) consisting of 50.5 wt % polypropylene having an MFR of 4.0 g/10 min, 45 wt % calcined clay having an average particle diameter of 1.2 μm, 1.0 wt % titanium oxide having a particle diameter of 0.8 μm and 3.5 wt % high density polyethylene were melt-kneaded in separate extruders, and then propylene homopolymer (C) was laminated to composition (B) within a die. The resulting coextrusion film was laminated to both sides of the stretched film obtained in (1) above, which had a stretch ratio of 5, in such a manner that the polymer (C) constituted the outermost layers. The resulting five layered laminate was heated to 185° C. and then stretched in the transverse direction to a stretch ratio of 7.5 to obtain a five layered film.

(3) The surface of this five layered film was subjected to a corona discharge treatment to obtain a five layered laminate in which the individual layers (C)/(B)/(A)/(B)/(C) had thicknesses of 5/30/80/30/5 μm.

This five layered laminate film, having a total thickness of 150 μm, had the properties shown in Table 2.

COMPARATIVE EXAMPLE 4

(1) a (A) mixture (A) consisting of 90 wt % propylene homopolymer having an MFR of 0.8 g/10 min (melting point, 164° C.) and 8 wt % high density polyethylene was melt-kneaded in an extruder, extruded into sheeting using a die, and then cooled in a cooling machine to obtain an unstretched film. This film was heated to 155° C. and stretched in the machine direction to a stretch ratio of 5.

(2) Propylene homopolymer (C) having an MFR of 4.0 g/10 min and a composition (B) consisting of 86.5 wt % polypropylene having an MFR of 4.0 g/10 min, 10 wt % calcium carbonate having an average particle diameter of 1.5 μm and 3.5 wt % high density polyethylene were melt-kneaded in separate extruders, and then propylene homopolymer (C) was laminated to composition (B) within a die. The resulting coextrusion film was laminated to both sides of the stretched film obtained in (1) above, which had a stretch ratio of 5, in such a manner that the polymer (C) constituted the outermost layers. The resulting five layered laminate was heated to 185° C. and then stretched in the transverse direction to a stretch ratio of 7.5 to obtain a five layered film.

(3) The surface of this five layered film was subjected to a corona discharge treatment to obtain a five layered laminate in which the individual layers (C)/(B)/(A)/(B)/(C) had thicknesses of 5/20/50/20/5 μm.

This five layered laminate film, produced in accordance with JP-A-1-156062, having a total thickness of 100 μm, had the properties shown in Table 2.

COMPARATIVE EXAMPLE 5

Synthetic tracing paper "YUPO TPG 75" (trade name), manufactured by Oji Yuka Synthetic Paper Co., Ltd., was used.

COMPARATIVE EXAMPLE 6

General purpose opaque synthetic paper "YUPO FPG 95" (trade name), manufactured by Oji Yuka Synthetic Paper Co., Ltd., was used.

The values of total light beam average reflectance and total light beam average transmittance given in Table 2 for each illuminated signboard are values obtained when the printed sheet of the illuminated signboard fabricated was illuminated from the side opposite to the side viewed by passersby, i.e., from the fluorescent tube side (the plain weave fabric side in Examples 1 and 2).

Illuminated Signboards

Images of carrots, pumpkins, pineapples and apples were printed on the front surface of each of the composite sheets, translucent films or opaque synthetic papers obtained in Example 2 and Comparative Examples 3 to 6 (each having a length of 1.5 m and a width of 1 m) by five color offset printing. The back surface of each was also subjected to five color offset printing using a negative printing plate opposite to that used for the front surface. Thus, poster papers for illuminated signboards were obtained which bore the indicated images in a white background.

These poster papers each was fixed to a frame. Six 40 watt white fluorescent tubes were arranged 5 cm from the back surface of each poster paper to obtain illuminated signboards. With respect to the translucent films of Comparative Examples 4 and 5, an acrylic resin plate having a thickness of 5 mm and an opacity of 40% was disposed on the back side of the poster paper to prevent the fluorescent tubes from being viewed from the outside of the illuminated signboards.

These illuminated signboards were also evaluated by the same persons and graded in appearance from the 1st to 5th positions. The number of voters for each position was totalled.

The 1st, 2nd, 3rd, 4th, and 5th positions were given 5, 4, 3, 2, and 1 point, respectively. These points were totalled for each illuminated signboard.

The results obtained are shown in Table 2.

TABLE 2

|  | Ex. 2 | Comp. Ex. 3 | Comp. Ex. 4 | Comp. Ex. 5 | Comp. Ex. 6 |
| --- | --- | --- | --- | --- | --- |
| Thickness (μm) | 133 | 150 | 100 | 75 | 95 |
| Opacity (%) | 89 | 62 | 12 | 34 | 92 |
| Whiteness (%) | 95 | 92 | 91 | 86 | 96 |
| Total light beam average reflectance (%) | 15 | 55 | 2 | 26 | 85 |
| Total light beam average transmittance (%) | 88 | 45 | 95 | 74 | 12 |
| Density (g/cm$^3$) | 0.75 | 1.02 | 0.94 | 1.00 | 0.77 |
| Evaluation |  |  |  |  |  |
| Number of persons giving the 1st position | 18 | 2 | 0 | 0 | 0 |
| Number of persons giving the 2nd position | 2 | 13 | 0 | 5 | 0 |
| Number of persons giving the 3rd position | 0 | 4 | 2 | 14 | 0 |
| Number of persons giving the 4th position | 0 | 1 | 18 | 0 | 1 |
| Number of persons giving the 5th position | 0 | 0 | 0 | 1 | 19 |
| Total point | 98 | 76 | 42 | 63 | 21 |
| Remarks | — | — | JP-A-1-156062 | YUPO trace "TPG 75" | YUPO "FPG 95" |

The present invention provides an illuminated signboard containing a poster which has high brightness, bears printed characters and images having sharp outlines, and is hence attractive.

While the invention has been described in detail and with reference to specific embodiments thereof, it will be apparent to one skilled in the art that various changes and modifications can be made therein without departing from the spirit and scope thereof.

What is claimed is:

1. A sheet for an illuminated signboard comprising as a base a composite sheet comprising a plain weave fabric (I) having laminated on one or both sides thereof a microporous film (II) comprising a stretched thermoplastic resin film containing fine white inorganic particles, said sheet for an illuminated signboard satisfying the following requirements (1) to (4):

(1) said sheet has an opacity (JIS P-8128) of from 80 to 100%;

(2) said sheet has a whiteness (JIS L-1015) of from 85 to 100%;

(3) said sheet has a total light beam average reflectance (JIS K-7105) of from 12 to 40%; and (4) said sheet has a total light beam average transmittance (JIS K-7105) of from 70 to 95%.

2. The sheet for an illuminated signboard as claimed in claim 1, wherein the microporous film (II) is a laminated film comprising a substrate layer (A) comprising a biaxially stretched thermoplastic resin film containing from 0 to 40 wt % fine white inorganic particles and, disposed on both sides of the substrate layer, front and back layers B and B' each consisting of a uniaxially stretched thermoplastic resin film containing from 0.1 to 5 wt % titanium oxide particles and from 10 to 60 wt % fine particles of a white inorganic material selected from the group consisting of calcium carbonate and calcined clay.

3. The sheet for an illuminated signboard as claimed in claim 1, wherein the plain weave fabric (I) has a basis weight of from 50 to 200 g/m$^2$ and is woven of warp threads of 40 to 150 denier at 50 to 140 ends per inch and weft threads of 40 to 150 denier at 50 to 140 picks per inch interlaced for every thread.

4. The sheet for an illuminated signboard as claimed in claim 1, which has formed on a surface of the microporous film (II) an image recording/receiving layer (III) selected from the group consisting of
  (a) an ink receiving layer capable of forming a recorded image with a water based ink,
  (b) an ink receiving layer for thermosensitive recording,
  (c) a coating layer for laser printing, and
  (d) a thermal transfer image receiving layer.

5. The sheet for an illuminated signboard as claimed in claim 4, wherein the ink receiving layer (a) comprises, on a solid basis, from 50 to 88 wt % pigment, from 10 to 40 wt % water based adhesive and from 2 to 20 wt % ink setting agent.

6. The sheet for an illuminated signboard as claimed in claim 5, wherein the water based ink is an ink jet recording ink.

7. The sheet for an illuminated signboard as claimed in claim 1, which has, formed on a surface of the microporous film (II), a polymer layer (III') having an antistatic function.

8. An illuminated signboard comprising a sheet having an image or characters printed thereon, a frame to which the sheet is fixed, and a light source for illuminating the sheet, said sheet being a composite sheet which comprises a plain weave fabric (I) having laminated on one or both sides thereof a microporous film (II) comprising a stretched thermoplastic resin film containing fine white inorganic particles, which sheet satisfies the following requirements (1) to (4):
  (1) said sheet has an opacity (JIS P-8128) of from 80 to 100%;
  (2) said sheet has a whiteness (JIS L-1015) of from 85 to 100%;
  (3) said sheet has a total light beam average reflectance (JIS K-7105) of from 12 to 40%; and
  (4) said sheet has a total light beam average transmittance (JIS K-7105) of from 70 to 95%.

9. The illuminated signboard as claimed in claim 8, wherein the microporous film (II) is a laminated film comprising a substrate layer (A) consisting of a biaxially stretched thermoplastic resin film containing from 0 to 40 wt % fine white inorganic particles and, disposed on both sides of the substrate layer, front and back layers B and B' each consisting of a uniaxially stretched thermoplastic resin film containing from 0.1 to 5 wt % titanium oxide particles and from 10 to 60 wt % fine particles of a white inorganic material selected from the group consisting of calcium carbonate and calcined clay.

10. The illuminated signboard as claimed in claim 8, wherein the plain weave fabric (I) has a basis weight of from 50 to 200 g/m$^2$ and is woven of warp threads of 40 to 150 denier at 50 to 140 ends per inch and weft threads of 40 to 150 denier at 50 to 140 picks per inch interlaced for every thread.

11. The illuminated signboard as claimed in claim 8, where the composite sheet has formed on a surface of the microporous film (II) an image recording/receiving layer (III) selected from the group consisting of
  (a) an ink receiving layer capable of forming a recorded image with a water based ink,
  (b) an ink receiving layer for thermosensitive recording,
  (c) a coating layer for laser printing, and
  (d) a thermal transfer image receiving layer.

12. The illuminated signboard as claimed in claim 11, wherein the ink receiving layer (a) comprises, on a solid basis, from 50 to 88 wt % pigment, from 10 to 40 wt % water based adhesive and from 2 to 20 wt % ink setting agent.

13. The illuminated signboard as claimed in claim 12, wherein the water based ink is an ink jet recording ink.

14. The illuminated signboard as claimed in claim 8, wherein the composite sheet has formed on a surface of the microporous film (II) a polymer layer (III') having an antistatic function.

* * * * *